INVENTOR.
R. A. BOBO

INVENTOR.
R. A. BOBO

BY Hudson & Young
ATTORNEYS

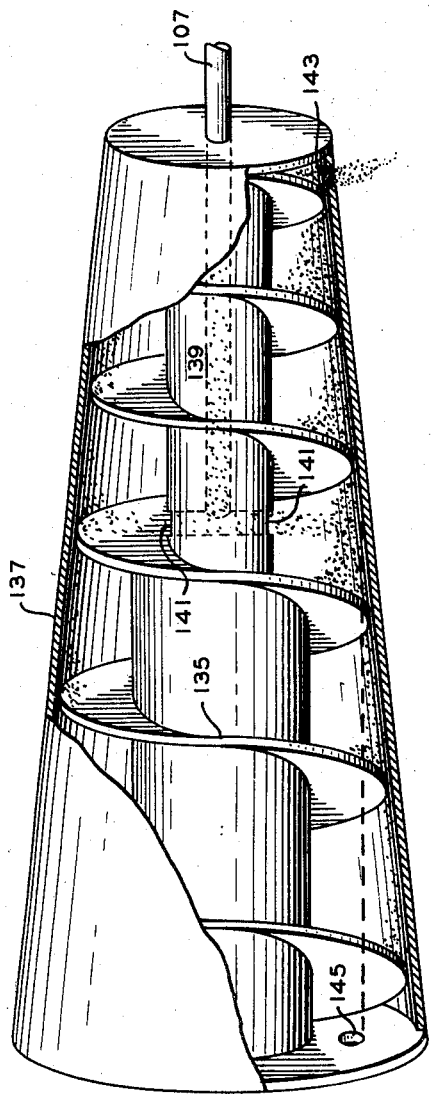
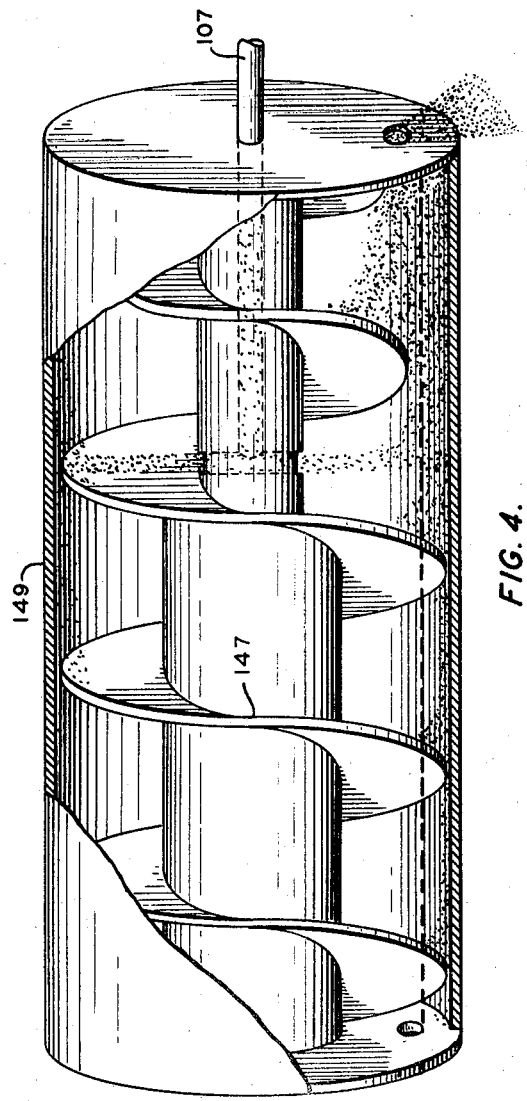
FIG. 3.
FIG. 4.
INVENTOR.
R. A. BOBO

United States Patent Office 2,895,669
Patented July 21, 1959

2,895,669

MECHANICAL TREATMENT OF DRILLING MUDS

Roy A. Bobo, Houston, Tex., assignor to Phillips Petroleum Company, a corporation of Delaware Application September 13, 1954, Serial No. 455,425

9 Claims. (Cl. 233—21)

This invention relates to the mechanical treatment of drilling muds. In one aspect, this invention relates to a method and apparatus for the mechanical treatment of weighted drilling muds. In another aspect, this invention relates to an apparatus, comprising a centrifugal classifier, for mechanically treating drilling muds while drilling, cleaning up work-over muds and reducing the lime content of completion drilling muds.

The drilling mud in any circulatory system is made viscous and difficult to pump by gradual accumulation of drilled solids which pass through the shale shaker and are continually reground. In a weighted drilling mud, such as one containing a large proportion of barite or other weighting materials by volume, the amount of drilled solids that may be tolerated is greatly reduced. Much effort has been expended to control the effects of such solids by chemical treatment. Although chemical treatment is quite effective, the time eventually comes at deeper depths after enough drilled solids have entered the system when a portion of the drilling mud must be discarded and replaced with water and more weighting material. Once this has begun, this process is generally continued at frequent intervals with resultant high maintenance costs.

At the termination of drilling, the mud is usually contaminated with large amounts of light solids and suspended chemicals which makes the mud unsuitable for completion operations. Such a drilling mud is likewise limited in utility for other drilling operations.

Earlier attempts to provide various types of mechanical treatment for drilling muds to recover from them the costly weighting materials and also to remove the undesirable light solids have been abandoned in the art because the equipment necessary was very expensive, one reason being that the equipment used was custom made for each job. A need has existed for a method and apparatus for mechanically treating a drilling mud which can be readily adapted to many drilling sites without expensive modification.

It is an object, therefore, of this invention to provide a method and apparatus for the mechanical treatment of drilling muds.

It is a further object of this invention to provide an apparatus for mechanically treating drilling muds so as to maintain desirable plastic flow properties of the drilling muds.

It is a still further object of this invention to provide an apparatus which can be moved from well to well without expensive modification to separate light weight materials from heavy weight materials in drilling muds.

In accordance with this invention, a method and apparatus is provided which comprises the use of a centrifugal classifier to treat drilling muds. The method comprises diluting the drilling mud to facilitate the separation of light and heavy components therein and passing the diluted mud under conditions of turbulent flow through a pipe having a length equal to at least 45 diameters of said pipe into a zone of centrifugal classification. There the mud is separated into two streams, one of which contains the heavier components of the drilling mud and the other of which contains the lighter components of the drilling muds.

In a preferred embodiment of my invention, a compact, portable apparatus for the mechanical treatment of drilling muds is provided which comprises a unitary frame, and mounted and operatively connected on said frame a centrifugal classifier, a power unit, and other auxiliary equipment, and means for measuring, mixing and passing to said classifier the drilling mud and diluent. The method of the invention and its advantages, and particularly the apparatus which represents a preferred embodiment of the invention, will be better understood and their uses and advantages better appreciated when read in conjunction with the accompanying drawings wherein:

Figure 3 is an elevation, partially in section, of a conical rotating bowl with an internal rotatable screw conveyor which is an element of the preferred centrifugal classifier used in the apparatus of the invention; and Figure 4 is an elevation, partially in section, of a cylindrical rotating bowl having an internal rotatable screw conveyor which is a modification of the element shown in Figure 3, which can be used in the apparatus of this invention.

Figure 1:
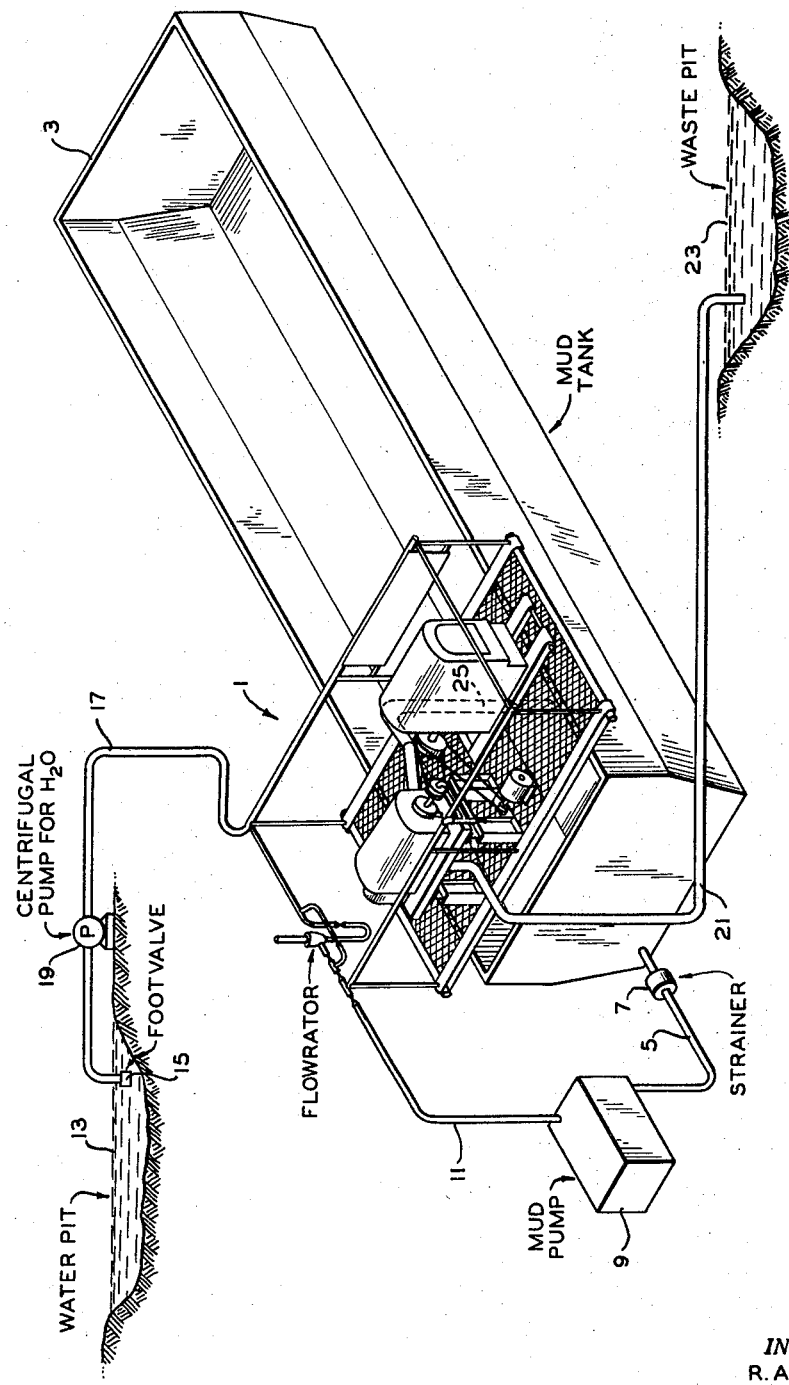
Figure 1 is an over-all perspective view of the apparatus of this invention showing its relationship to a mud tank and other conventional facilities at a well drilling site.

Referring now to Figure 1, there is shown the unitized treatment apparatus 1 for mechanically treating drilling muds in accordance with the present invention. The treatment apparatus 1 is shown in detail in Figure 2 and the specific elements thereof, which in combination constitute a preferred embodiment of the present invention, will be completely discussed in connection with Figure 2.

The treatment apparatus 1 is shown in Figure 1 mounted on a mud tank 3. Since an advantage of the treatment apparatus 1 resides in its portability and compactness, apparatus 1 can obviously be used to advantage in other positions relative to mud tank 3, such as by placing apparatus 1 in any desired position adjacent to the mud tank 3. An advantage in placing the treatment apparatus 1 directly upon the mud tank, as shown, is that the effluent pipes from the centrifugal classifier can be shortened.

Drilling mud to be treated is withdrawn from mud tank 3 through a pipe 5 carrying a strainer 7 by a mud pump 9 which passes the drilling mud via a pipe 11 to the treatment apparatus 1.

Mud pump 9 is a positive displacement pump and is used to meter the drilling mud to the treatment apparatus 1 and is in addition to the conventional mud pump used to circulate mud to the well. To this end, mud pump 9 can be a pump driven by a variable speed, direct current motor or a constant speed, alternating current motor having a variable speed drive, such as a variable diameter pulley. It can be readily seen that strainer 7, pipe 5, mud pump 9 and pipe 11 can be defined as a means for withdrawing, metering and passing drilling mud from the mud tank to the treatment apparatus.

Water used to dilute the drilling mud and to facilitate the action of the centrifugal classifier is withdrawn from a water pit 13 through a footvalve 15 and is passed via pipe 17 by a centrifugal water pump 19 to the treatment apparatus 1. Footvalve 15, water pump 19 and pipe 17 can be defined as means for withdrawing water from the water pit and passing same to the treatment apparatus.

Effluent from the treatment apparatus 1, which is to be discarded and which generally comprises the light weight solid material in the drilling mud, is passed via a pipe 21 to a waste pit 23.

Effluent from the treatment apparatus 1, which is retained and which generally comprises the heavy weight solid material, can be returned to the mud tank 3 via a pipe 25, as shown, or to a separate storage tank, not shown, as desired.

Figure 2:
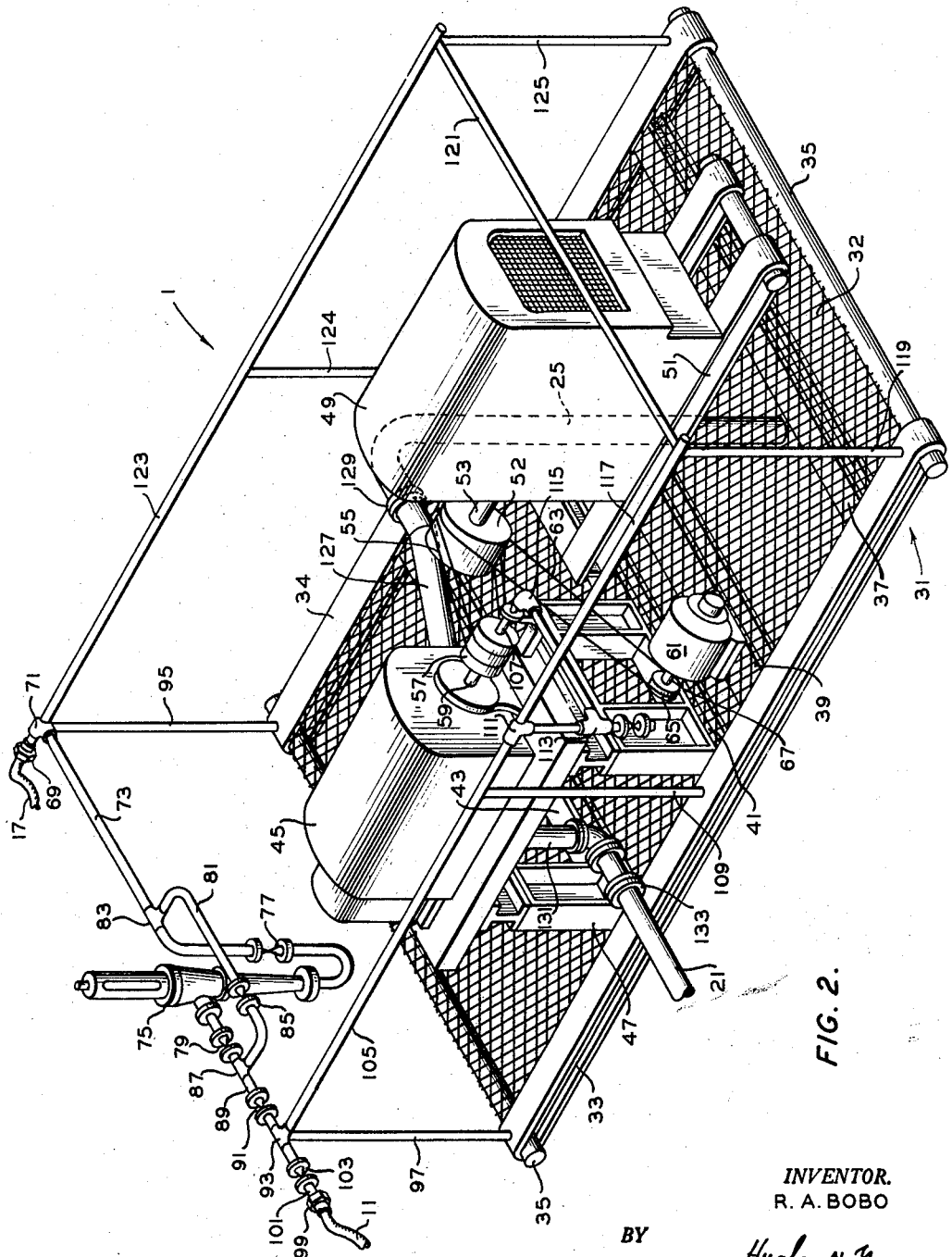
Figure 2 is a perspective view of the apparatus for mechanically treating drilling muds which is a preferred embodiment of this invention.

Referring now to Figure 2, there is shown the treatment apparatus 1 which constitutes a preferred embodiment of my invention.

A welded steel frame 31 is constructed from two 6 inch by 6 inch, 20 pound galvanized I beams 33 and 34, which are about 10½ feet long and a pair of 4½ inch scrap drilling pipes 35 which are about 7 feet, 9 inches long. I beam cross members 37, 39, 41 and 43 provide rigidity for frame 31 and support for other elements of apparatus 1 mounted above. By welding these elements of frame 31 into a rectangle, as shown in Figure 2, there is provided an extremely rugged support for the treatment apparatus 1 which is needed during operation of the apparatus, as well as during lifting and moving of the apparatus. The upper surface of frame 31 is covered by a suitable floor covering material 32, such as an expanded metal flooring.

It is to be remembered that an important advantage for my invention is that the apparatus is compact and portable. The apparatus can be lifted and moved from well site to well site to perform its function of mechanically treating drilling muds. In this connection, the dimensions of frame 31, mentioned above, have been selected with this in mind. Thus, the width of about 7 feet, 9 inches permits the apparatus to be placed on a motor-driven truck and hauled on public highways without interference to vehicular traffic.

A centrifugal classifier 45 is mounted on frame 31, as shown. Classifier 45 rests on and is securely attached to a support 47 which raises the classifier above the floor 32 of the frame 31. Support 47 rests on and is securely attached to I beam cross members 41 and 43. Centrifugal classifier 45 is preferred to be a decanting type of centrifuge. The specific construction of centrifuges which are used and preferred in the combination of the present invention is discussed in detail in connection with Figures 3 and 4.

A gas-engine power unit 49 is mounted on frame 31, as shown. Power unit 49 rests on and is securely attached to support 51 which rests on and is attached to I beam cross members 37 and 39.

Power from unit 49 is transmitted to classifier 45 by a pulley 52 carried on a rotating shaft 53 of unit 49 and pulley belt 55 which engages pulley 57 carried on a rotating shaft 59 of classifier 45.

Power from unit 49 is also transmitted to an electric generator 61 by a pulley belt 63 which engages pulley 52 and a pulley 65 which is carried on a rotating shaft 67 of generator 61.

Generator 61 is mounted on and securely attached to I beam cross member 39 of frame 31.

Water to dilute the drilling mud in, for example, about equal parts by weight enters apparatus 1, as previously described in Figure 1, via pipe 17 which is connected to apparatus 1 by a pipe union connection 69. Pipe 17 can conveniently be a flexible hose. Water passes through a pipe L 71 and a pipe 73 to a water measuring means 75. A water flowmeter which has been found to be satisfactory is illustrated by means 75 and is called the Magnesite Flowrator which is sold by Fisher and Porter Company, Hatboro, Pennsylvania. A valve 77 in pipe 73 controls the entrance to water measuring means 75 and a valve 79 controls the exit from water measuring means 75.

A bypass pipe 81 connects into a pipe T 83 in pipe 73 and a valve 85 controls the fluid flow through pipe 81.

Pipe 81 connects into a pipe T 87 in a pipe 89, one end of which is connected to the downstream end of valve 79.

A valve 91 controls pipe 89 and the other end of pipe 89 is connected to a pipe T 93 downstream of valve 91.

It will be noted that pipe 73 and pipe 89 and associated parts thereof are positioned at a height above floor 32 so as to form a handrail for apparatus 1. To this end, pipe L 71 and pipe T 93 are supported at the proper handrail height above floor 32 by support pipes 95 and 97, respectively. Pipe 95 is welded at its ends to I beam 34 and pipe ell 71. Support pipe 97 is welded at its ends to I beam 33 and pipe T 93.

Drilling mud is withdrawn from mud tank 3 by mud pump 9, as described in connection with Figure 1, and is passed via pipe 11 to the drilling mud treating apparatus 1. Pipe 11 can conveniently be a flexible hose. Hose 11 is connected to apparatus 1 by a pipe union 99. Union 99 is connected to pipe T 93 by a short pipe 101 which carries a control valve 103.

Thus, the drilling mud and water both pass through pipe T 93. The diluted mud is then conveyed by a pipe 105 to the centrifugal classifier 45. The mixture of mud and water enters classifier 45 through a stationary feed tube 107.

Pipe 105 is arranged to extend from pipe T 93 longitudinally above I beam 33 at a proper height above floor 32 to act as a handrail for apparatus 1. Pipe 105 is supported at one end by a support pipe 109 which is welded at its ends to I beam 33 and pipe 105. Pipe 105 carries a pipe L 111, a T-valve 113 and a pipe L 115 which permit pipe 105 to connect into centrifugal classifier 45 at its position in apparatus 1.

To complete the handrail for apparatus 1, a handrail pipe 117 is positioned above I beam 33 and is welded at one end to pipe L 111 and at its other end to a support pipe 119. Support pipe 119 is welded at its ends to one end of I beam 33 and to the end of handrail pipe 117. The handrail for apparatus 1 is completed by a handrail pipe 121 and a handrail pipe 123. Handrail pipe 121 extends across one end of apparatus 1 above pipe 35 and is welded at its ends to support pipe 119 and handrail pipe 123. Handrail pipe 123 extends the length of apparatus 1 above I beam 34 and is welded at one end to pipe L 71 and at its other end to handrail pipe 121 and the upper end of support pipe 125. A support pipe 124 is positioned intermediate the ends of handrail pipe 123 and pipe 124 is welded at its ends to handrail pipe 123 and to I beam 34.

A feature of the apparatus 1 resides in the mixing of the water and drilling mud in pipe 105. The water and drilling mud pass through pipe 105 under conditions of turbulent flow. To this end, the length of pipe 105 is at least approximately equal to 45 diameters of pipe 105, which has been found to provide complete and adequate mixing for the mud and water. By this means, there is no need for a special mixing device, such as a centrifugal pump or a jet mixer. Furthermore, pipe 105 serves a dual purpose, as described above, by serving as a part of the handrail for apparatus 1.

In the centrifugal classifier 45, the diluted drilling mud is separated into two streams, one containing heavier material, such as barite, customarily used to give weight to drilling mud, and the other containing a lighter material which is usually discarded. The heavier material is generally desired to be retained and is passed via a pipe 127 and pipe 25 to the mud tank 3. Pipe 127 and pipe 25 are connected by a flange connection 129.

The lighter material is passed out of classifier 45 via a pipe 131 and pipe 21 to waste pit 23. Pipe 131 and pipe 21 are connected by a flange connection 133.

It should be noted that both flange connection 129 and flange connection 133 are positioned within the confines of frame 31. Thus, when apparatus 1 is moved, there are no projections beyond the outer edge of frame 31 which might cause difficulty in transporting apparatus 1.

Referring now to Figures 3 and 4, there are shown examples of rotating bowls with internal screw conveyors which are important elements of centrifugal classifier 45.

In Figure 3, a helical screw conveyor 135 is shown which rotates inside a conical bowl 137, which also rotates in the same direction as screw conveyor 135. Bowl 137 rotates at a slightly higher speed than conveyor 135, however. The speed of rotation of bowl 137 creates a high centrifugal force acting at right angles to the axis of rotation.

Diluted drilling mud enters bowl 137 through stationary feed tube 107, as shown in Figure 3, which extends into a hollow center shaft 139. Shaft 139 has a plurality of open ports 141 and the heavier material in the drilling mud, acted upon by centrifugal force, is thrown outwardly through ports 141 and deposited against the inner wall of bowl 137. The lighter material, including the liquid in the drilling mud, being of a lower specific gravity, forms a concentric inner layer in bowl 137.

The heavier materials deposited against the bowl wall are conveyed toward the narrow end of the bowl by the pitch and forward rotation of the helix relative to the bowl, where the heavy material is discharged through a plurality of ports 143 into pipe 127. The lighter material and liquid is rejected through a plurality of ports 145 at the opposite end of bowl 137 into pipe 131.

In Figure 4, a helical screw conveyor 147 in a cylindrical bowl 149 is shown. The principle of operation is the same in Figure 4 as in Figure 3 with the heavier material being discharged through pipe 127 and the lighter material being discharged through pipe 131. The embodiment shown in Figure 3 is preferred over that shown in Figure 4 because in the latter the heavier material is not subjected to as effective a positive feed by screw 147 as by screw 135 in Figure 3.

The apparatus and method of the invention have been tested in actual drilling operations. A 15 lb./gal. drilling mud on a Chocolate Bayou well in Brazoria County, Texas, drilled at 12,000 feet, was processed in the apparatus of this invention. About one-fifth of the mud in the circulatory system was processed per day. The yield value was lowered from 0.1771 to 0.1001 pound per square foot and the plastic viscosity was reduced from 37.8 to 33.8 centipoises. By chemical treatment alone, the yield value is the only component of resistance to flow that can be reduced appreciably.

One of the main advantages of the use of this invention in the treatment of drilling muds lies in the continual maintenance of minimum viscosities. It is generally acknowledged that good mud flow properties contribute to better bottom hole cleaning action and subsequent increase in the rate of penetration.

With the use of this invention, a marked reduction in chemicals that are required for maintenance results. In the Chocolate Bayou well, on which the apparatus and method of this invention was tested, the quantity of chemicals used after mechanical treatment was initiated was only one-fifth that used prior to installation. The invention was used on the well from 11,800 feet to 14,600 feet.

Much has been included in the literature on the effects of lime on high temperature gelation and high temperature solidification. Muds with high lime content will often solidify during drilling operations. Much more often, lime muds solidify when placed above the packer upon completion.

My invention can be used effectively to remove a good portion of the active lime in a mud system upon completion. It also makes possible the drilling of deep wells without resorting to lime treatment.

Upon completion of deep wells, the general practice is to abandon the contaminated mud remaining in the pits. My invention can be used to clean up, concentrate, and salvage a valuable portion of mud which otherwise would be discarded.

A further advantageous use for my invention lies in the removal of "spent" chemicals from the mud. Part of the increase in viscosity which occurs with continued use of the mud is due to the accumulation of chemicals that have been added and whose effectiveness has been dissipated. By removing such chemicals, my invention aids in maintaining a low viscosity in weighted muds.

I claim:

1. An apparatus for resolving a drilling mud into heavier materials and lighter materials which comprises, in combination, a centrifugal classifier having an inlet, a source of power operatively connected to said classifier, a mixing tube connected to said classifier inlet, said mixing tube being of a length equal to at least about 45 diameters of said tube, a means for passing said drilling mud into said mixing tube and a conduit means for passing a liquid diluent into said mixing tube so that said drilling mud and liquid diluent pass through said mixing tube under conditions of turbulent flow, a means for measuring the rate of flow of said diluent installed in said conduit means and a rectangular metal frame having a floor and having mounted thereon said classifier, source of power, mixing tube and conduit means, said frame having a rectangular handrail, and said mixing tube and said conduit means being arranged to act as part of said handrail.

2. An apparatus for resolving a drilling mud into a heavier material and a lighter material which comprises, in combination, a centrifugal classifier having an inlet, a heavy material outlet pipe and a light material outlet pipe, a source of power operatively connected to said classifier, a mixing tube connected to said classifier inlet, said mixing tube being of a length equal to at least about 45 diameters of said tube, a means for passing drilling mud into said mixing tube and a conduit means for passing a liquid diluent into said mixing tube so that said drilling mud and liquid diluent pass through said mixing tube under conditions of turbulent flow, a means for measuring the rate of flow of said diluent installed in said conduit means, a rectangular metal frame having a floor covering and having mounted thereon said classifier, source of power, mixing tube and conduit means, said frame having a rectangular handrail, said conduit means being arranged to be the handrail above and across one end of said frame, said mixing tube being connected through one arm of a T connection to one end of said conduit means which is connected to a second arm of said T connection above one corner of said frame, the third arm of said T connection having a pipe union installed therein, a pipe union installed in the other end of said conduit means, and said heavy material outlet pipe and light material outlet pipes terminating within the confines of said frames and having flanged pipe connections attached to the ends thereof.

3. An apparatus in accordance with claim 2 wherein said centrifugal classifier comprises a rotatable, conical bowl and a rotatable, helical screw conveyor within said bowl, a means for rotating said bowl and conveyor in the same direction and for rotating said bowl at a greater speed than said conveyor, an outlet at the small end of said bowl which communicates with said heavy material outlet pipe and an outlet at the large end of said bowl which communicates with said light material outlet pipe.

4. An apparatus in accordance with claim 2 wherein said centrifugal classifier comprises a rotatable, cylindrical bowl and a rotatable, helical screw conveyor within said bowl, a means for rotating said bowl and conveyor in the same direction and for rotating said bowl at a greater speed than said conveyor, an outlet at each end of said bowl, said heavy material outlet pipe communicating with the outlet at the end of said bowl towards which said helical screw conveyor rotates, and said light material outlet pipe communicating with the outlet at the end of said bowl away from which said helical screw conveyor rotates.

5. An apparatus for resolving a drilling mud into a heavier material and a lighter material which comprises, in combination, a centrifugal classifier having an inlet, a source of power operatively connected to said classifier, a mixing tube connected at one end to said classifier inlet, a rectangular metal frame having a floor covering and having mounted thereon said classifier, and source of power, said frame having a rectangular handrail, the other end of said mixing tube being connected to one arm of a T connection and said mixing tube being positioned so as to be a part of the handrail along one side of said frame, said T connection being positioned above one corner of said frame, a means for passing drilling mud into a second arm of said T connection and a conduit means for passing a liquid diluent into the third arm of said T connection, said conduit means being positioned so as to be the handrail across one end of said frame.

6. A method for resolving a drilling mud into a lighter material and a heavier material which comprises, adding water to said drilling mud, the weight of said added water being approximately equal to the weight of said drilling mud to which said water is added, mixing said drilling mud and added water by passing same under conditions of turbulent flow through a length of pipe equal to at least about 45 diameters of said pipe, passing the thus mixed drilling mud and water into a zone of centrifugal classification, centrifugally classifying the mixed drilling mud and water to produce a stream of heavy material and a stream of lighter material, and separately recovering each of said streams by positively displacing said stream of heavy material from said zone.

7. An apparatus for resolving a drilling mud into heavier materials and lighter materials which comprises, in combination, a centrifugal classifier having an inlet, a mixing tube connected to said classifier inlet, means for passing said drilling mud into said mixing tube, means for passing a liquid diluent into said mixing tube so that said drilling mud and liquid diluent pass through said mixing tube under conditions of turbulent flow, a power source for imparting centrifugal force to the drilling mud-diluent mixture in said classifier, and a frame supporting said classifier, mixing tube, and power source, said mixing tube being spaced from said frame to serve as a handrail.

8. A method resolving a drilling mud into a lighter material and a heavier material which comprises adding water to said drilling mud, the weight of said added water being approximately equal to the weight of said drilling mud to which said water is added, passing the resulting diluted drilling mud through a zone of turbulence wherein said drilling mud and diluent become thoroughly mixed and thence into a zone of centrifugal classification, centrifugally classifying the mixed drilling mud and water to produce a stream of heavy material and a stream of lighter material, and separately recovering each of said streams by positively displacing said stream of heavy material from said zone.

9. The method of claim 8 wherein said weighting material is barite.

References Cited in the file of this patent

UNITED STATES PATENTS

| | | |
|---|---|---|
| 981,680 | Peck | Jan. 17, 1911 |
| 2,156,333 | Cross | May 2, 1939 |
| 2,311,606 | Bannister | Feb. 16, 1943 |
| 2,576,283 | Chaney | Nov. 27, 1951 |
| 2,679,974 | Gooch | June 1, 1954 |
| 2,720,358 | Silk | Oct. 11, 1955 |
| 2,779,536 | Pomeroy | Jan. 29, 1957 |